United States Patent
Antel, Jr. et al.

(10) Patent No.: US 9,599,410 B2
(45) Date of Patent: Mar. 21, 2017

(54) PLATE-LIKE AIR-COOLED ENGINE SURFACE COOLER WITH FLUID CHANNEL AND VARYING FIN GEOMETRY

(75) Inventors: William Joseph Antel, Jr., Freising (DE); Carlos Enrique Diaz, Munich (DE); Jorge Carretero Benignos, Munich (DE)

(73) Assignee: General Electric Company, Niskayuna, NY (US)

( * ) Notice: Subject to any disclaimer, the term of this patent is extended or adjusted under 35 U.S.C. 154(b) by 916 days.

(21) Appl. No.: 13/560,779

(22) Filed: Jul. 27, 2012

(65) Prior Publication Data

US 2014/0027102 A1    Jan. 30, 2014

(51) Int. Cl.
*F28F 13/00* (2006.01)
*F28F 3/02* (2006.01)
(Continued)

(52) U.S. Cl.
CPC ............... *F28F 3/02* (2013.01); *B23P 15/26* (2013.01); *F02K 3/115* (2013.01); *F28D 1/0246* (2013.01); *F28D 1/06* (2013.01); *F28F 1/16* (2013.01); *F28F 3/048* (2013.01); *F28F 13/12* (2013.01); *F28F 21/084* (2013.01);
(Continued)

(58) Field of Classification Search
CPC ............ H05K 7/20154; H05K 7/20163; H01L 23/467; F28F 1/04; F28F 1/26; F28F 3/02; F28F 1/025; F28F 1/06; F28F 1/08; F28F 9/16; F28F 9/18; F28F 1/16; F28F 3/048; F28F 13/12; F28F 21/084; F02K 3/115; F28D 1/0246; F28D 1/06; Y10T 29/4935;
(Continued)

(56) References Cited

U.S. PATENT DOCUMENTS

| 4,546,605 A | 10/1985 | Mortimer et al. |
| 4,561,246 A | 12/1985 | Hovan |

(Continued)

FOREIGN PATENT DOCUMENTS

| EP | 0132237 A2 | 1/1985 |
| EP | 1557357 A2 | 7/2005 |

(Continued)

OTHER PUBLICATIONS

Boundary Layer; Epifanov, V. M.; DOI: 10.1615/AtoZ.b.boundary_layer; Article last modified: Mar. 16, 2011; accessed May 30, 2016 at http://www.thermopedia.com/content/595/.*

(Continued)

*Primary Examiner* — Len Tran
*Assistant Examiner* — Gordon Jones
(74) *Attorney, Agent, or Firm* — Robert M. McCarthy

(57) ABSTRACT

A surface cooler includes a plate-like layer and a plurality of spaced-apart fins extending substantially perpendicular from an uppermost layer of the plate-like layer. The plurality of fins defining a plurality of air flow paths. The plurality of spaced-apart fins are configured to augment heat transfer of the surface cooler by increasing the turbulence levels of a fluid flowing through the airflow paths by promoting increased mixing with a resulting increase in the heat transfer coefficient of the surface cooler. A method of forming the surface cooler and an engine including the surface cooler.

15 Claims, 7 Drawing Sheets

(51) Int. Cl.

| | |
|---|---|
| *B23P 15/26* | (2006.01) |
| *F28D 1/02* | (2006.01) |
| *F02K 3/115* | (2006.01) |
| *F28F 3/04* | (2006.01) |
| *F28F 21/08* | (2006.01) |
| *F28D 1/06* | (2006.01) |
| *F28F 1/16* | (2006.01) |
| *F28F 13/12* | (2006.01) |

(52) U.S. Cl.
CPC .......... *F05D 2260/213* (2013.01); *F05D 2260/2212* (2013.01); *Y02T 50/671* (2013.01); *Y02T 50/676* (2013.01); *Y10T 29/4935* (2015.01)

(58) Field of Classification Search
CPC ....... F05D 2260/213; F05D 2260/2212; Y02T 50/671; Y02T 50/676
USPC ........................................................ 165/146
See application file for complete search history.

(56) References Cited

U.S. PATENT DOCUMENTS

| | | | |
|---|---|---|---|
| 4,696,156 A | 9/1987 | Burr et al. | |
| 4,773,212 A | 9/1988 | Griffin et al. | |
| 5,564,496 A | 10/1996 | Blum et al. | |
| 5,887,649 A * | 3/1999 | Kim ................ | 165/151 |
| 6,058,696 A | 5/2000 | Nikkanen et al. | |
| 6,106,229 A | 8/2000 | Nikkanen et al. | |
| 6,390,181 B1 * | 5/2002 | Hall .................... | H01L 23/3732 165/185 |
| 6,729,383 B1 * | 5/2004 | Cannell ................ | F28F 3/022 165/185 |
| 6,807,059 B1 * | 10/2004 | Dale ............................ | 361/703 |
| 7,182,124 B2 | 2/2007 | Chen | |
| 7,434,765 B2 | 10/2008 | Zielinski et al. | |
| 7,810,552 B2 | 10/2010 | Slaughter | |
| 7,856,824 B2 | 12/2010 | Anderson et al. | |
| 2003/0111215 A1 * | 6/2003 | Walther ................ | B21B 27/005 165/133 |
| 2004/0194627 A1 | 10/2004 | Huang et al. | |
| 2004/0228781 A1 | 11/2004 | Tonkovich et al. | |
| 2006/0042223 A1 | 3/2006 | Walker et al. | |
| 2006/0117734 A1 | 6/2006 | Larkin et al. | |
| 2007/0215326 A1 | 9/2007 | Schwarz et al. | |
| 2007/0264133 A1 | 11/2007 | Schwarz et al. | |
| 2008/0028763 A1 | 2/2008 | Schwarz et al. | |
| 2008/0093174 A1 | 4/2008 | Suciu et al. | |
| 2008/0110596 A1 | 5/2008 | Schwarz et al. | |
| 2008/0121376 A1 | 5/2008 | Schwarz et al. | |
| 2008/0142189 A1 | 6/2008 | Norris et al. | |
| 2008/0304958 A1 | 12/2008 | Norris et al. | |
| 2008/0314573 A1 | 12/2008 | Schwarz et al. | |
| 2009/0097972 A1 | 4/2009 | Murphy | |
| 2009/0165995 A1 * | 7/2009 | Bajusz .................... | F01D 25/02 165/51 |
| 2009/0169359 A1 | 7/2009 | Murphy et al. | |
| 2009/0317238 A1 | 12/2009 | Wood et al. | |
| 2010/0108289 A1 | 5/2010 | Guinan et al. | |
| 2010/0155016 A1 | 6/2010 | Wood et al. | |
| 2010/0282456 A1 * | 11/2010 | Benignos et al. ............. | 165/182 |
| 2011/0150634 A1 * | 6/2011 | Bajusz et al. ................. | 415/145 |
| 2011/0179767 A1 | 7/2011 | Rinjonneau et al. | |
| 2012/0111552 A1 | 5/2012 | Benignos et al. | |
| 2012/0114467 A1 | 5/2012 | Elder | |
| 2012/0114468 A1 | 5/2012 | Elder | |

FOREIGN PATENT DOCUMENTS

| | | |
|---|---|---|
| EP | 1876328 A2 | 1/2008 |
| EP | 1882824 A2 | 1/2008 |
| EP | 1916399 A2 | 4/2008 |
| JP | 2004084488 A | 3/2004 |
| WO | 2008045054 A1 | 4/2008 |
| WO | 2011139317 A2 | 11/2011 |

OTHER PUBLICATIONS

Search Report and Written Opinion from corresponding PCT Application No. PCT/US2013/046961 dated Oct. 16, 2013.
Siegel et al.,"Effect of Fin Passage Length on Optimization of Cylinder Head Cooling Fins", NASA Technical Paper 1054, 1977.
Le Claire.,"Surface Heat Exchangers", Aeronautical Quarterly, pp. 40-54, vol. 27, Feb. 1976.

* cited by examiner

PLATE-LIKE AIR-COOLED ENGINE SURFACE COOLER WITH FLUID CHANNEL AND VARYING FIN GEOMETRY

BACKGROUND

This invention relates generally to turbomachines, and more particularly to the design of an enhanced heat exchanger, in the form of an air-cooled surface cooler, for use in turbomachines.

Modern turbofan/turbojet engines have an ever-increasing demand of cooling, including gearbox oil, cooling air and electronics, while at the same time their efficiency has to be pushed ever higher. Currently air-cooled oil coolers are usually plate-fin type "brick" heat exchangers that are mounted within the bypass channel to receive flow from the engine intake or bypass stream or from a separate air-intake in the nacelle. New designs have mitigated the high drag of this design due to the plate-fin exchanger sitting in the bypass channel by utilizing a surface cooler that is mounted flush with the aft fan cowling. However, the space in this region of the engine is limited and current designs utilize nearly all the available space. As a result, newer engine technologies, which have more heat that must be dissipated, will be thermally constrained due to the lack of space available onto which the cooler may be formed. In addition, current heat exchangers such as these plate-fin "brick" coolers obstruct the air flow and incur aerodynamic losses as the cooling requirements grow. These losses mean increased specific fuel consumption.

By using a surface cooler where only the cooler fins project into the engine air bypass flow, the drag of the oil cooler heat exchanger has been reduced over that of a traditional plate-fin cooler. However increasing heat loads requires that the surface cooler will need to be larger in size. Aircraft weight is a current concern in the current industry, with a decrease in aircraft weight resulting in an efficiency increase. In addition, new engines are becoming space constrained, making the size and weight of these types of plate-fin coolers prohibitive.

In an attempt to increase efficiency of these known surface coolers, it is desirable to reduce the size and costs, while increasing the heat transfer performance. Typically, increased heat transfer can be achieved by increasing the turbulence of the flow or the effective heat transfer area. By increasing the turbulence levels of the flow and thus increasing the heat transfer coefficient of the surface cooler, the cooler size can be reduced. This will provide for a decrease in the overall size and thus weight of the surface cooler and allow for a cooler of sufficient duty to fit on the engine.\

Accordingly, there is a need for an improved surface cooler having augmented heat transfer capability without unfavorable pressure drops.

BRIEF SUMMARY OF THE INVENTION

These and other shortcomings of the prior art are addressed by the present disclosure, which provides a surface cooler. The surface cooler is configured to benefit from a novel fin configuration wherein a plurality of spaced-apart fins are configured to augment heat transfer of the surface cooler by increasing the turbulence levels of a fluid flowing through the airflow paths by promoting increased mixing with a resulting increase in the heat transfer coefficient of the surface cooler.

In accordance with an embodiment, a surface cooler is provided. The surface cooler including a plate-like layer comprising a thermally conductive material; and a plurality of spaced-apart fins extending substantially perpendicular from an uppermost layer of the plate-like layer. The plurality of fins comprising a thermally conductive material and defining a plurality of air flow paths. The plurality of spaced-apart fins are configured to augment heat transfer of the surface cooler by increasing the turbulence levels of a fluid flowing through the airflow paths by promoting increased mixing with a resulting increase in the heat transfer coefficient of the surface cooler.

In accordance with another embodiment, a surface cooler is provided. The surface cooler including a plate-like layer comprising one of a solid metal, a metal foam, a carbon foam or a combination thereof; a plurality of fluidic conduits disposed in the plate-like layer, wherein the plurality of fluidic conduits is configured to carry fluid to be cooled; and a plurality of spaced-apart fins extending substantially perpendicular from an uppermost layer of the plate-like layer, the plurality of fins comprising a thermally conductive material and defining a plurality of air flow paths. The plurality of spaced-apart fins are configured to augment heat transfer of the surface cooler by increasing the turbulence levels of a fluid flowing through the airflow paths by promoting increased mixing with a resulting increase in the heat transfer coefficient of the surface cooler.

In accordance with yet another embodiment, a method of fabricating a surface cooler is provided. The method including forming a plate-like layer; disposing at least one fluidic conduit in the plate-like layer, wherein the at least one fluidic conduit is configured to carry fluid to be cooled; and machining the plate-like layer to form a plurality of spaced-apart fins. The plurality of spaced-apart fins are configured to augment heat transfer of the surface cooler by increasing the turbulence levels of a fluid flowing through the airflow paths by promoting increased mixing with a resulting increase in the heat transfer coefficient of the surface cooler In accordance with yet another embodiment, an engine is provided. The engine including a core engine; and a surface cooler. The surface cooler comprising: a plate-like layer comprising one of a solid metal, a metal foam, a carbon foam or a combination thereof; a plurality of fluidic conduits disposed in the plate-like layer, wherein the plurality of fluidic conduits is configured to carry fluid to be cooled; and a plurality of spaced-apart fins extending substantially perpendicular from an uppermost layer of the plate-like layer, the plurality of fins comprising a thermally conductive material and defining a plurality of air flow paths. The plurality of spaced-apart fins are configured to augment heat transfer of the surface cooler by increasing the turbulence levels of a fluid flowing through the airflow paths by promoting increased mixing with a resulting increase in the heat transfer coefficient of the surface cooler.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

Embodiment disclosed herein relate to surface coolers and more particularly to enhanced surface coolers for use in a nacelle of an engine such as an aircraft engine. The exemplary surface coolers may be used for providing efficient cooling. Further, the term "surface coolers" as used herein may be used interchangeably with the term "heat exchangers". As used herein, the surface coolers are applicable to various types of turbomachinery applications such as, but not limited to, turbojets, turbo fans, turbo propulsion engines, aircraft engines, gas turbines, steam turbines, wind turbines, and water turbines. In addition, as used herein, singular forms such as "a", "an", and "the" include plural referents unless the context clearly dictates otherwise.

Figure 1:
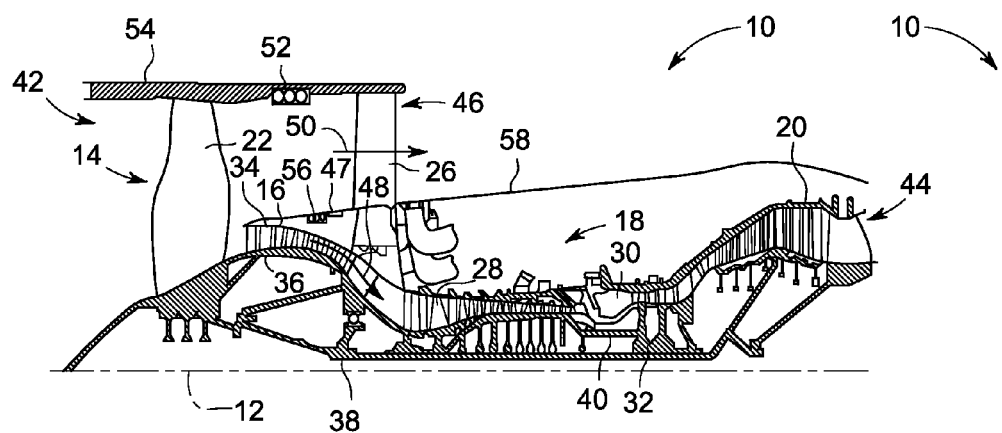
FIG. 1 is a diagrammatic illustration of an engine, in accordance with aspects disclosed herein.

FIG. 1 is a schematic illustration of an exemplary aircraft engine assembly 10 in accordance with the present disclosure. Reference numeral 12 may be representative of a centerline axis 12. In the exemplary embodiment, the engine assembly 10 includes a fan assembly 14, a booster compressor 16, a core gas turbine engine 18, and a low-pressure turbine 20 that may be coupled to the fan assembly 14 and the booster compressor 16. The fan assembly 14 includes a plurality of rotor fan blades 22 that extend substantially radially outward from a fan rotor disk 24, as well as a plurality of outlet guide vanes 26 that may be positioned downstream of the rotor fan blades 22. The core gas turbine engine 18 includes a high-pressure compressor 28, a combustor 30, and a high-pressure turbine 32. The booster compressor 16 includes a plurality of rotor blades 34 that extend substantially radially outward from a compressor rotor disk 36 coupled to a first drive shaft 38. The high-pressure compressor 28 and the high-pressure turbine 32 are coupled together by a second drive shaft 40. The engine assembly 10 also includes an intake side 42, a core engine exhaust side 44, and a fan exhaust side 46.

During operation, the fan assembly 14 compresses air entering the engine 10 through the intake side 42. The airflow exiting the fan assembly 14 is split such that a portion 48 of the airflow is channeled into the booster compressor 16, as compressed airflow, and a remaining portion 50 of the airflow bypasses the booster compressor 16 and the core gas turbine engine 18 and exits the engine 10 through the fan exhaust side 46 as bypass air. This bypass air portion 50 flows past and interacts with the outlet guide vanes 26 creating unsteady pressures on the stator surfaces as well as in the surrounding airflow that radiate as acoustic waves. The plurality of rotor blades 40 compress and deliver the compressed airflow 48 towards the core gas turbine engine 18. Furthermore, the airflow 48 is further compressed by the high-pressure compressor 28 and is delivered to the combustor 30. Moreover, the compressed airflow 48 from the combustor 30 drives the rotating high-pressure turbine 32 and the low-pressure turbine 20 and exits the engine 10 through the core engine exhaust side 44.

As previously noted, in certain presently available commercial engines heat exchangers are employed. Furthermore, high heat loads may lead to sub-optimal performance of certain heat exchangers. In accordance with exemplary aspects of the present technique, a device 52 configured to function as a surface cooler is presented. More particularly, the exemplary device 52 may be configured to address the heat exchange requirements of a turbomachine such as an aircraft engine, for example. Hereinafter, the term "surface cooler" may be used to refer to the device 52 configured to facilitate cooling of the turbomachine.

According to aspects of the present technique, the exemplary surface cooler 52 may comprise an aluminum plate and fin design (described presently). In an alternate embodiment, the surface cooler may comprise alternate thermally conductive material, such as, but not limited to, titanium and steel. By way of example, the plate materials include those having thermal conductivity in the range from about 14 W/m*K to about 390 W/m*K. It may be noted that the exemplary surface cooler may additionally include a foam material having high thermal conductivity, in certain other embodiments. By way of example, foams may include carbon foams having thermal conductivity in the range from about 150 W/m*K to about 390 W/m*K. In other embodiments, a metal foam may include an aluminum foam with a thermal conductivity of about 189 W/m*K. As will be appreciated, a metal foam is a cellular structure consisting of a solid metal where a large volume fraction includes gas-filled pores. The pores may be sealed (closed-cell foam), or they may form an interconnected network (open-cell foam). Typically, these metal foams have a very high porosity. In other words, typically 75-95% of the volume consists of void spaces. It may be noted, that the thermal conductivity of metal foam may vary greatly, depending not only on the porosity, but also on finer details of the integrity of the webs that interconnect various cells in a foam.

According to embodiment of the present technique, the exemplary surface cooler 52 may be disposed alongside a nacelle wall or an outer wall 54 to facilitate heat transfer, according to embodiments of the present disclosure and will be described in greater detail hereinafter.

In an alternate embodiment, FIG. 1 additionally illustrates a surface cooler device 56 that may be placed along an inner wall 58 of the bypass flow 50 connecting the bottom of outlet guide vane 26. Surface coolers 52 and 56 may be similarly formed.

Figure 2:
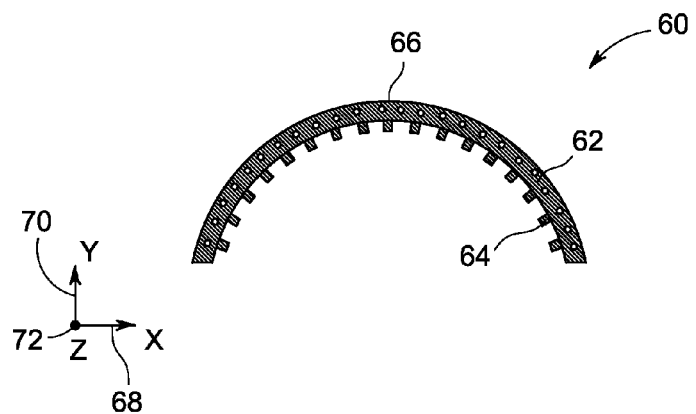
FIG. 2 a diagrammatic illustration of a circumferential cross-section of an exemplary surface cooler, in accordance with aspects disclosed herein.

Referring now to FIG. 2, a diagrammatic illustration of an axial cross-section of an exemplary surface cooler 60 in accordance with one aspect of the present disclosure is depicted. As illustrated in FIG. 2, the surface cooler 60 includes a plate-like layer 62 having a plurality of fins 64 extending therefrom and oriented as described herein. It may be noted that according to the aspects of the present technique, the plate-like layer 62 may be disposed alongside the nacelle wall or the outer wall 54 (see FIG. 1). In accordance with aspects of the present technique, the plate-like layer 62 may be formed as a thermally conductive plate, and more particularly as a metallic plate-like layer. Further, the plate-like layer 62 may additionally include a material such as, but not limited to, a metal foam, a carbon foam, or a combination thereof. Alternatively, the plate-like layer 62 may include a metal foam having high thermal conductivity. By way of example, the thickness of the plate-like layer 62 may vary in a range from about 0.5 inch to about 2.0 inches.

In accordance with aspects of the present technique, in an embodiment the plate-like layer 62 may be formed of a substantially solid metal material, such as aluminum. In alternate embodiment, the plate-like layer 62 may include, or formed substantially of a metal foam material that is used to augment heat transfer, and additionally may provide noise reduction. Specifically, the metal foams may be employed to augment heat transfer/cooling as the metal foams provide a good combination of enhanced thermal conduction, with a large surface area for convection, while also having a comparatively low mass. The plate-like layer 62, through the incorporation of a foam material, may be configured to provide means to facilitate heat exchange and acoustic attenuation in one low-mass package. In one embodiment, the plurality of fins 64 may also include a metallic material. More particularly, the metallic material may be formed and/or machined into the plurality of discrete fins 62. These fins 62 are configured protruding in a substantially perpendicular direction to the plate-like layer 62 and oriented substantially parallel to a main airflow, such as the bypass airflow 506 (see FIG. 1) in one embodiment. It may be noted that the airflow is in the z-direction 72. In addition to forming the plurality of fins 62, the fin material may also be machined and/or formed into pins and/or other structures configured to efficiently increase heat transfer.

Further, as illustrated, at least one and typically a plurality of fluidic conduits 66 may be formed or disposed in the plate-like layer 62 of the exemplary surface cooler 60. The plurality of fluidic conduits 66 may be configured to aid in cooling a fluid that may be heated by various parts of the engine. As will be appreciated, a fluid such as oil may be heated by parts of the engine such as bearings. This heated fluid (oil) may be channeled through the surface cooler 60 via the plurality of fluidic conduits 66. The heat from the fluid may be transferred from the walls of the plurality of fluidic conduits 66 and dissipated into the airflow via the surface cooler 60. This fluid may then be carried back to the parts in engine 10. In an embodiment, the plurality of fluidic channels 65 may be formed as channel-like structures in the plate-like layer 62, such as when layer 62 is formed of a solid aluminum material. In an alternate embodiment, plurality of fluidic channels 66 may be formed as tube-like structures that are disposed or embedded into the plate-like layer 62. In one embodiment, the plurality of fluidic conduits 66 is configured as a plurality of channels or tubes, wherein the dimensions of each of the plurality of channels or tubes may be about 0.5 inch in diameter. More particularly, the dimensions of each of plurality of channels or tubes may typically be less than the thickness of the plate-like layer 62.

In yet another embodiment, as described herein, a single tube or channel structure may be formed in the plate-like layer 62. In one embodiment, the fluid may include oil or water.

With continuing reference to FIG. 2, reference numeral 68 is generally representative of an x-direction, while a y-direction is represented by reference numeral 70. Also, reference numeral 72 is representative of a z-direction. It may be noted that the airflow is in the z-direction 72.

By implementing the exemplary surface cooler 60 including as described hereinafter, the plurality of fins 64 oriented to increase heat transfer, an increase in the turbulence of a flow or the effective heat transfer area may be achieved. The increase in the turbulence levels of the flow, and the resulting increase in the heat transfer coefficient of the surface cooler, provides for the surface cooler 62 to be reduced in size and thus weight.

Figure 3:
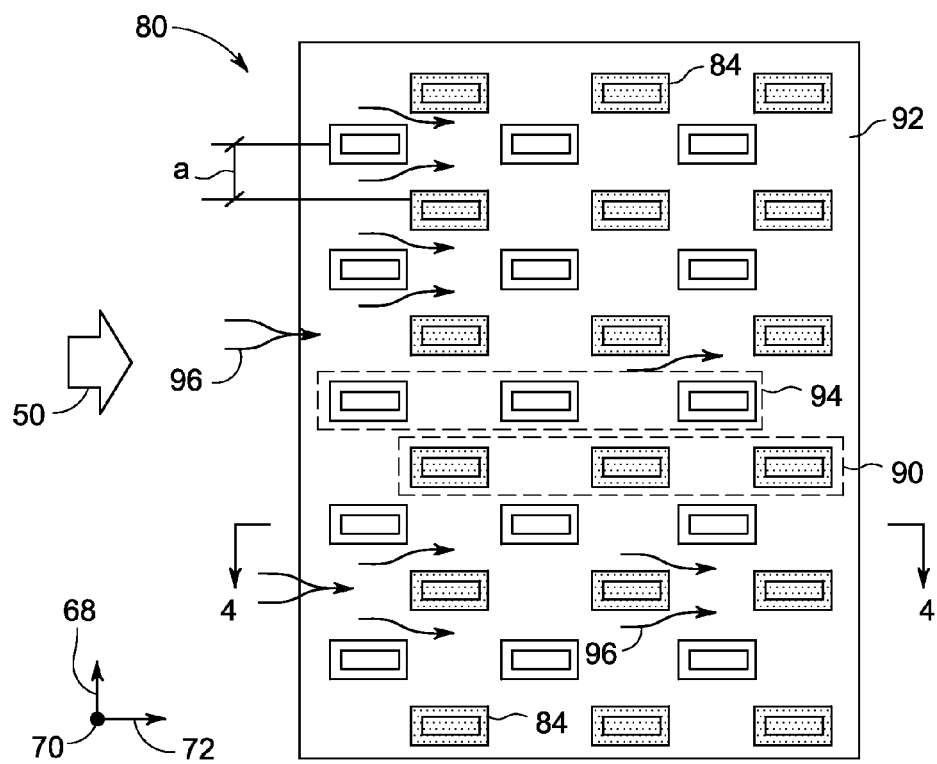
FIG. 3 is a diagrammatical illustration of a top view of an embodiment of an exemplary surface cooler, in accordance with aspects disclosed herein.
Figure 4:
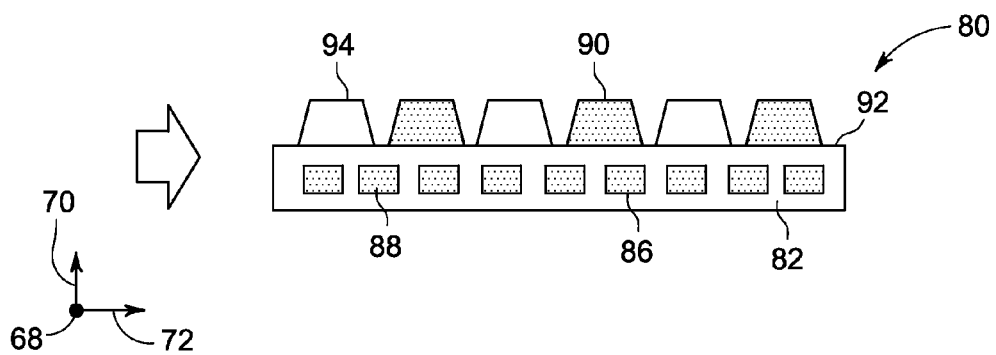
FIG. 4 is a diagrammatical illustration of a side view of the exemplary surface cooler of FIG. 3, taken through line 4-4 of FIG. 3, in accordance with aspects disclosed herein
Figure 5:
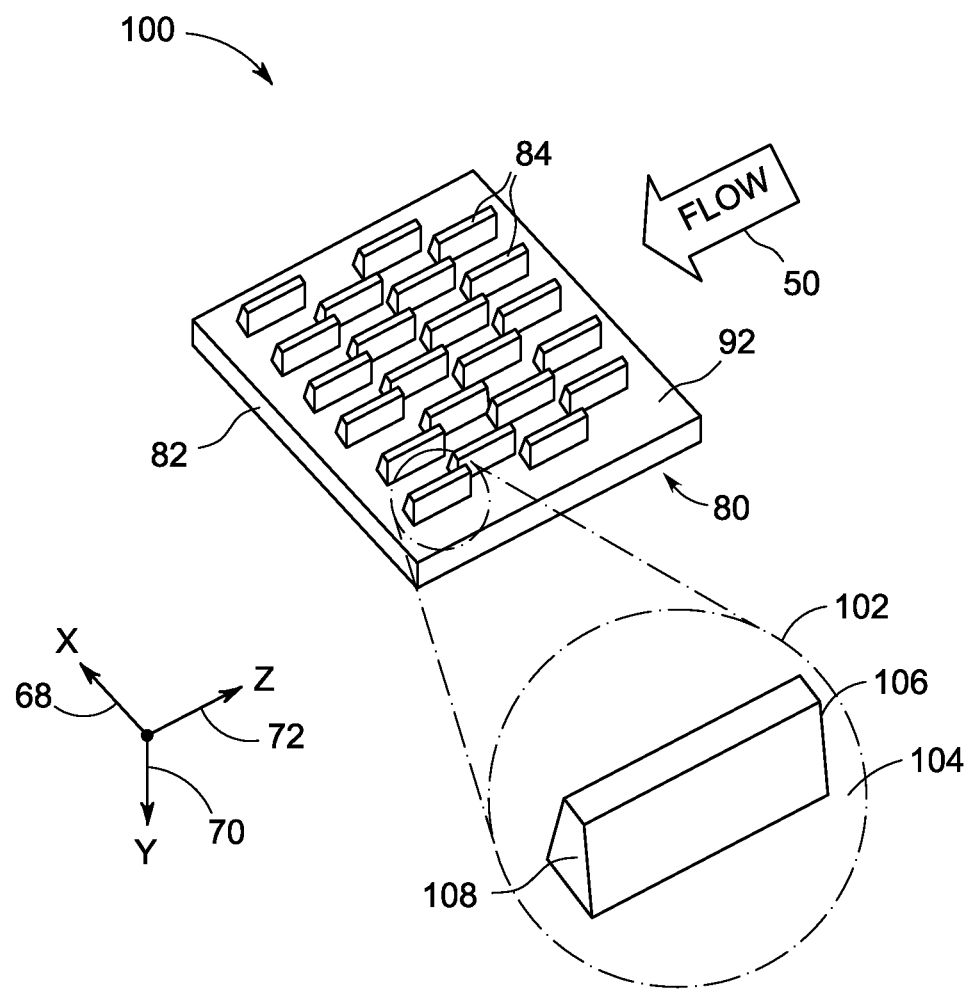
FIG. 5 is a perspective view of the exemplary surface cooler of FIG. 3, depicting the fin alignment, in accordance with aspects disclosed herein.

FIGS. 3-5 illustrate an embodiment of a portion of a surface cooler 80 in accordance with aspects disclosed herein. More particularly, FIG. 3 illustrates a top view of a portion of an embodiment of an exemplary surface cooler 80, in accordance with aspects disclosed herein. FIG. 4 is a diagrammatical illustration of a side view of a portion of the exemplary surface cooler 80 of FIG. 3, in accordance with aspects disclosed herein. FIG. 5 is a perspective view of a portion the exemplary surface cooler 80 of FIG. 3, depicting the fin alignment, in accordance with aspects disclosed herein. As noted above, the surface cooler 80 includes a layer 82, formed as a plate-like structure and onto which a plurality of fins 84 are formed protruding substantially perpendicular therefrom. The layer 82 of the surface cooler 80 is disposed alongside the nacelle wall or the outer wall 54 (see FIG. 1) of the turbo engine 10 (see FIG. 1). It may be noted that the airflow is in the z-direction 72 as indicated.

In the embodiment illustrated in FIGS. 3-5, a plurality of fluidic conduits, and more particularly, channels 86 are formed in the layer 82 of the surface cooler 80. The plurality of channels 86 may be configured to aid in cooling a fluid 88 that may be heated by various parts of the turbo engine 10 (see FIG. 1). As will be appreciated, the fluid 88 may be heated by parts of the turbo engine 10 such as bearings. The heated fluid 88 is be channeled through the surface cooler 80 via the plurality of channels 86. The heat from the fluid may be transferred from the walls of the plurality of channels 86 and dissipated into the airflow via the surface cooler 80. This fluid may then be carried back to the parts in engine 10.

The surface cooler 80 includes a first plurality of rows 90 of fins 84 protruding therefrom an uppermost surface 92 of the layer 82. The surface cooler 80 further includes a second plurality of rows of fins 84 protruding therefrom the uppermost surface 92 of the layer 82. The second plurality of rows 94 of fins 84 is configured offset by an amount up to one-half a transverse fin spacing, as indicated at "a", from an adjacent row of the first plurality of rows 90 of fins 84. In addition, alternate transverse fin spacing dimensions may be incorporated in light of specific design parameters. By offsetting the first and second pluralities of rows 90 and 94 of fins 114, a plurality of airflow paths, a portion of which are indicated by arrows 96, are formed wherein the bypass air flow 50, is subject to increased flow mixing as it flows past the plurality of fins 94. The airflow 50 is forced around the fins 114 as depicted to optimize heat transfer as well as aerodynamic performance of the fin 114. Calculations demonstrate that the weight of such a heat exchanger, or surface cooler, may be reduced by 6% over a surface cooler configured to include in-line fins. The increased heat transfer is due to increased flow mixing of the incoming bypass air portion 50 flowing in the z-direction 72 as indicated FIG. 5 illustrates a perspective view 100 of the exemplary surface cooler 80 with the plurality of fins 84 disposed on the layer 82. An exploded view 102 of a single fin 104, of the plurality of fins 84, with a first end 106 and a second end 108 is illustrated. As used herein, the term "first end" is a face of the fin 104 on which the airflow impinges, while the term "second end" is a face of the fin 104 that is away from the airflow 50. In accordance with exemplary aspects of the present technique, aerodynamic performance of the bypass flow 50 passing the plurality of fins 84 may be enhanced by forming a leading edge, a trailing edge, or a combination thereof on the first end 106 and the second end 108 of at least a portion of the plurality of fins 84. According to the embodiments of the present technique, the trailing edge and/or the leading edge may be formed using a solid metal. These solid metal edges may aid in preventing excessive pressure drop, thereby resulting in increased aerodynamic performance of the plurality of fins 84. As noted hereinabove, the plurality of fins 84 are configured to facilitate enhanced heat transfer by promoting an increase in the turbulence of a flow of the impinging bypass air 50.

Figure 6:
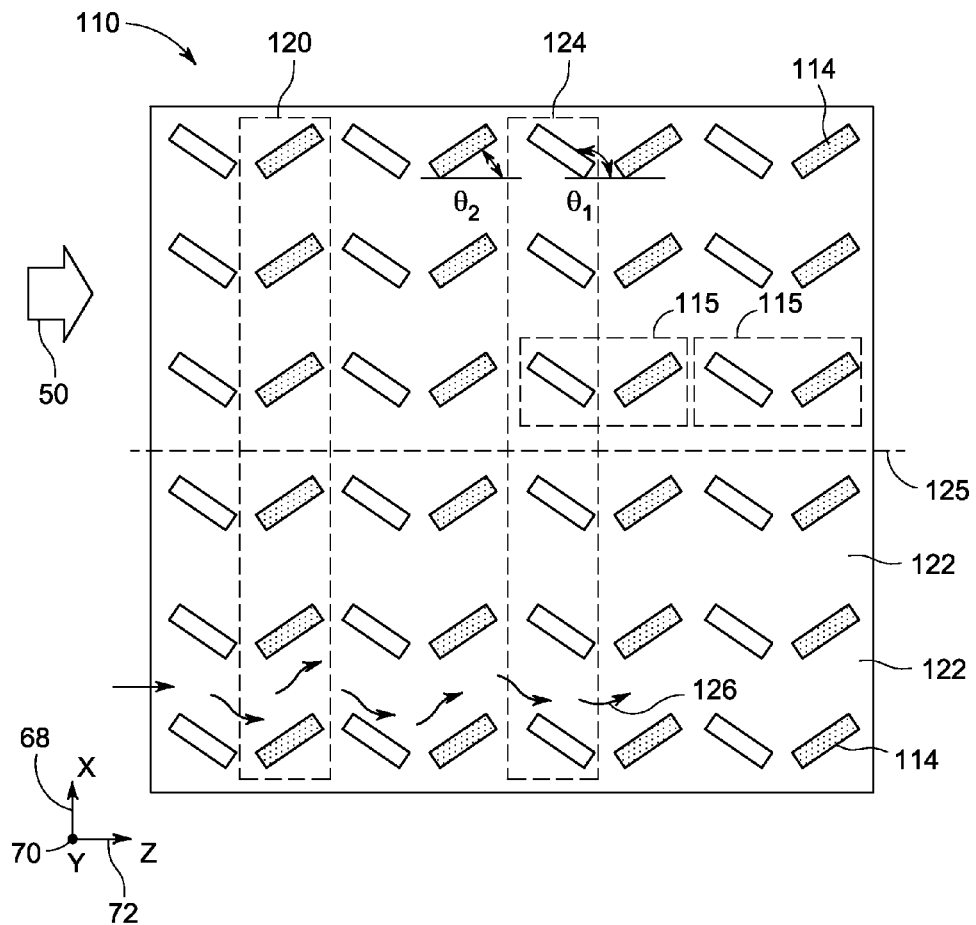
FIG. 6 is a diagrammatical illustration of a top view of another embodiment of an exemplary surface cooler, in accordance with aspects disclosed herein.
Figure 7:
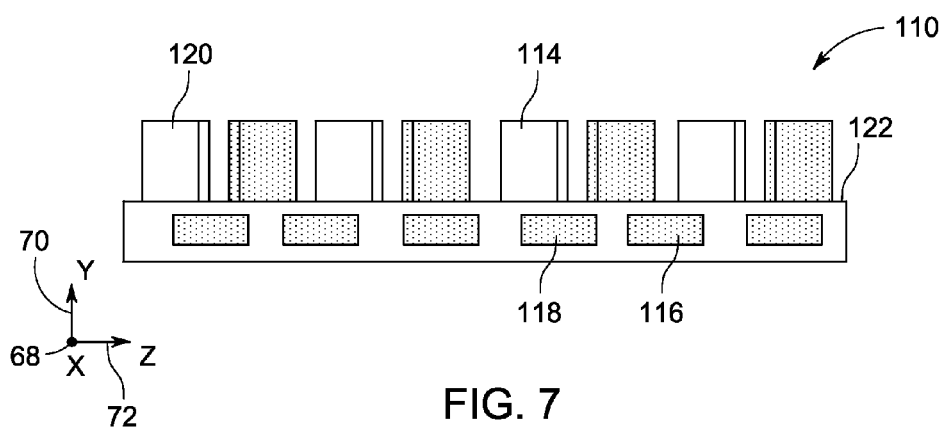
FIG. 7 is a diagrammatical illustration of a side view of the exemplary surface cooler of FIG. 6, in accordance with aspects disclosed herein
Figure 8:
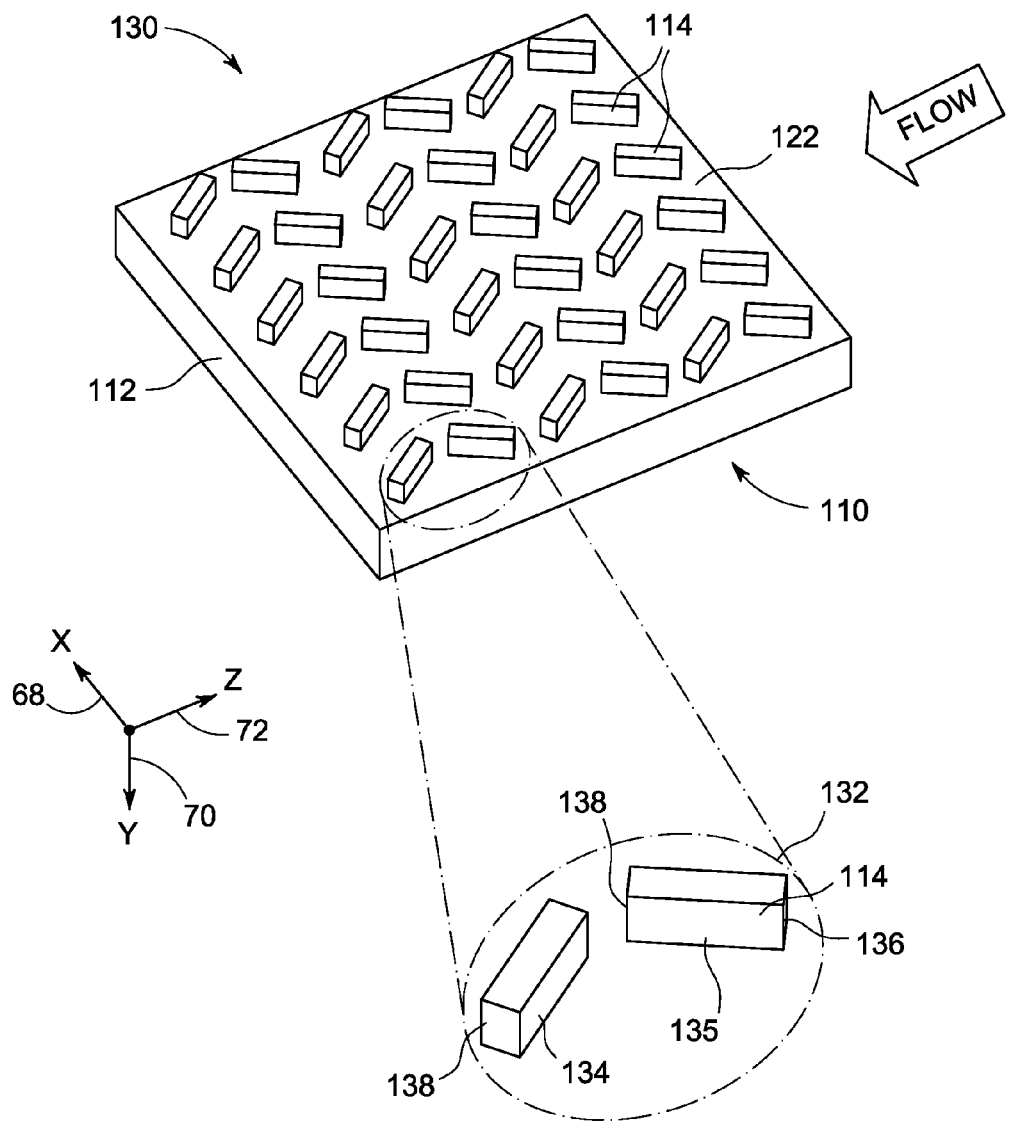
FIG. 8 is a perspective view of the exemplary surface cooler of FIG. 6, depicting the fin alignment, in accordance with aspects disclosed herein.

FIGS. 6-8 illustrate an embodiment of a surface cooler 110 in accordance with aspects disclosed herein. More particularly, FIG. 6 illustrates a top view of an embodiment of an exemplary surface cooler 110, in accordance with aspects disclosed herein. FIG. 7 is a diagrammatical illustration of a side view of the exemplary surface cooler 110 of FIG. 6, in accordance with aspects disclosed herein. FIG. 8 is a perspective view of the exemplary surface cooler 110 of FIG. 6, depicting the fin alignment, in accordance with aspects disclosed herein. Similar to the previously disclosed embodiment, the surface cooler 110 includes a layer 112, formed as a plate-like structure and onto which a plurality of fins 114 are formed. The layer 112 of the surface cooler 110 is disposed alongside the nacelle wall or the outer wall 54 (see FIG. 1) of the turbo engine 10 (see FIG. 1). It may be noted that the airflow is in the z-direction 72 as indicated.

In the embodiment illustrated in FIGS. 6-8, a plurality of channels 116 are formed in the layer 112 of the surface cooler 110. A heated fluid 118 may be channeled through the surface cooler 110 via the plurality of channels 116. The heat from the fluid 118 may be transferred from the walls of the plurality of channels 116 and dissipated into the airflow via the surface cooler 110. This fluid 118 may then be carried back to the parts in engine 10.

In this particular embodiment, the surface cooler 110 includes a first plurality of rows 120 of fins 114 protruding therefrom an uppermost surface 122 of the layer 112. The surface cooler 110 further includes a second plurality of rows 124 of fins 114 protruding therefrom the uppermost surface 122 of the layer 112. The first plurality of rows 120 of fins 114 and the second plurality of rows 124 of fins 114 are oriented at alternating angles to one another. More particularly, the plurality of first and second rows 120 and 124 of fins 114 are oriented alternately in first and second directions with respect to an axial direction 44 of the surface cooler 110 and more particularly in a z-direction 72. For example, pairs 115 of contiguous fins 114 are oriented alternately in first and second directions. Fins 114 oriented in the second direction are shown as shaded to differentiate from the fins oriented in the first direction. The first direction is at an angle 'θ1" with respect to the axial direction 125 of the surface cooler 110 and the second direction is at an angle "θ2" with respect to the axial direction 125 of the surface cooler 110, where $\theta_1$ is not equal to $\theta_2$, and whereby $\theta_1$ and $\theta_2$ are chosen to promote air flow mixing. By alternating the angular configuration of each of the first and second pluralities of rows 122 and 124 of fins 114, a plurality of airflow paths, a portion of which are indicated by arrows 126, are formed wherein the bypass air flow 50, is subject to increased flow mixing. It is surmised that an air side heat transfer coefficient will likewise increase. Similar to the previously disclosed embodiment, calculations demonstrate that the weight of such a heat exchanger, or surface cooler, may be reduced by approximately 50% over a surface cooler configured to include in-line fins. The increased heat transfer is due to increased flow mixing of the incoming bypass air portion 50 flowing in the z-direction 72 as indicated.

FIG. 8 illustrates a perspective view 130 of the exemplary surface cooler 110 with the plurality of fins 114 disposed on the layer 112. An exploded view 132 of a fin 134 of the first plurality of rows 120 of fins 114 and a fin 135 of the second plurality of rows 124 of fins 114 configured as described above, shows a first end 136 and a second end 138 is illustrated. As noted hereinabove, the plurality of fins 114 are configured to facilitate enhanced heat transfer by promoting an increase in the turbulence of a flow of the impinging bypass air 50.

Figure 9:
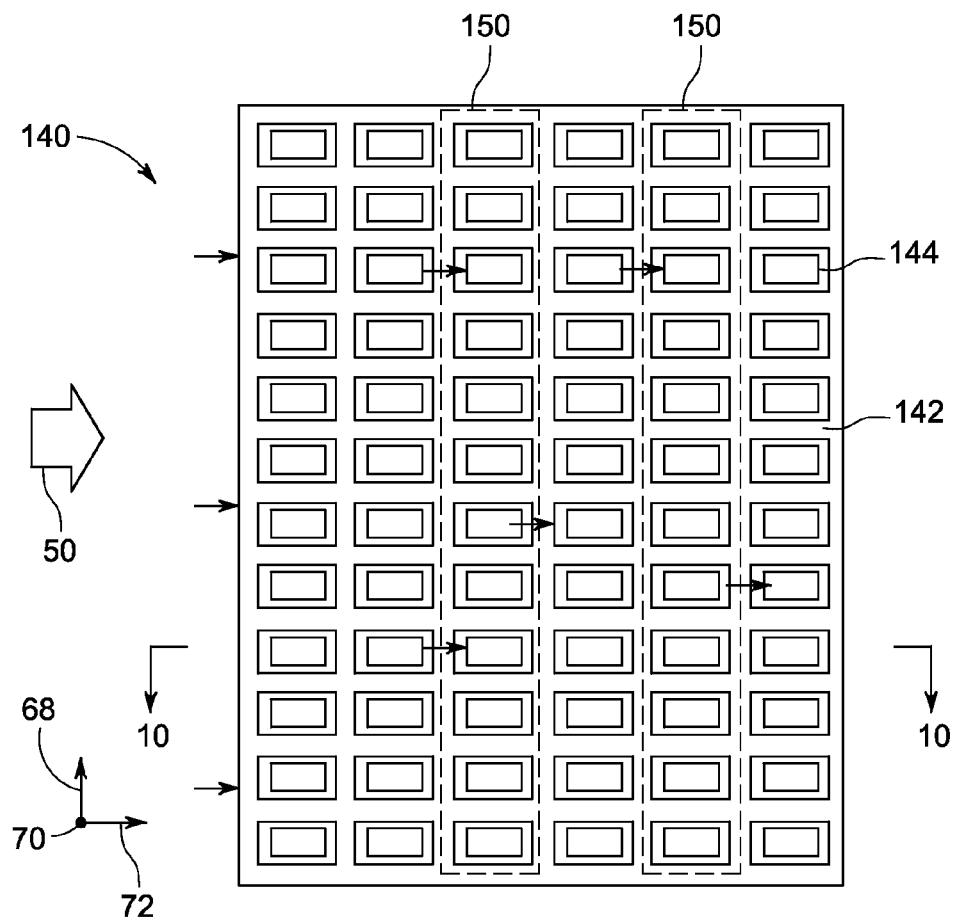
FIG. 9 is a diagrammatical illustration of a top view of yet another embodiment of an exemplary surface cooler, in accordance with aspects disclosed herein.
Figure 10:
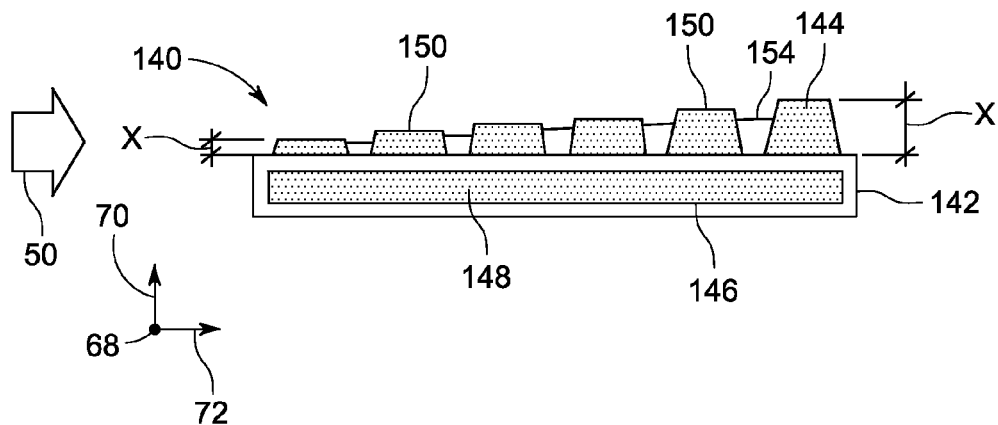
FIG. 10 is a diagrammatical illustration of a side view of the exemplary surface cooler of FIG. 9, taken through line 10-10 of FIG. 9, in accordance with aspects disclosed herein.
Figure 11:
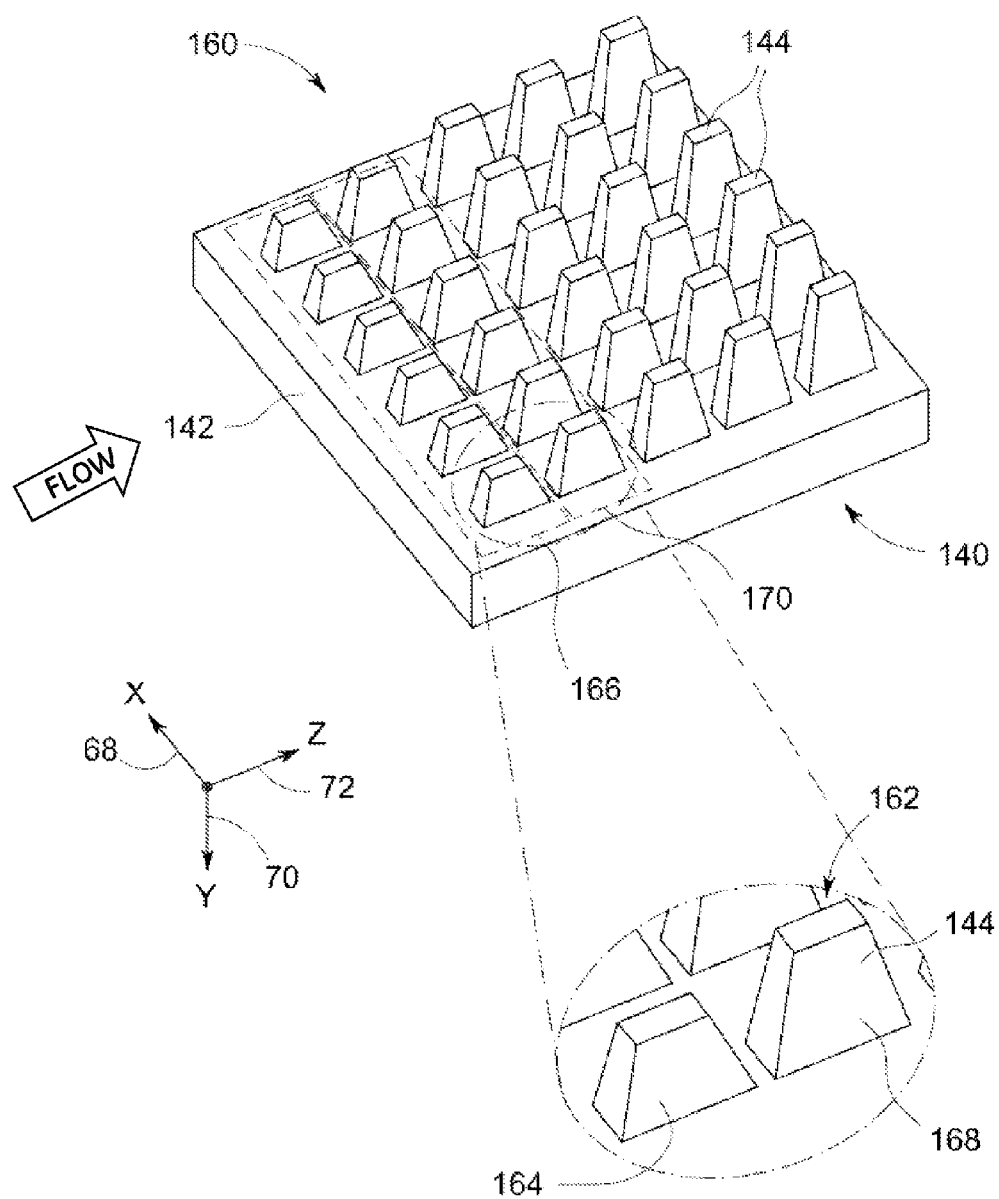
FIG. 11 is a perspective view of the exemplary surface cooler of FIG. 9, depicting the fin alignment, in accordance with aspects disclosed herein.

FIGS. 9-11 illustrate an embodiment of a surface cooler 140 in accordance with aspects disclosed herein. More particularly, FIG. 9 illustrates a top view of an embodiment of an exemplary surface cooler 140, in accordance with aspects disclosed herein. FIG. 10 is a diagrammatical illustration of a side view of the exemplary surface cooler 140 of FIG. 9, in accordance with aspects disclosed herein. FIG. 11 is a perspective view of the exemplary surface cooler 140 of FIG. 9, depicting the fin alignment, in accordance with aspects disclosed herein. Similar to the previously disclosed embodiments, the surface cooler 140 includes a layer 142, formed as a plate-like structure and onto which a plurality of fins 144 are formed. The layer 142 of the surface cooler 140 is disposed alongside the nacelle wall or the outer wall 54 (see FIG. 1) of the turbo engine 10 (see FIG. 1). It may be noted that the airflow is in the z-direction 72 as indicated.

In the embodiment illustrated in FIG. 9-11, a single channel 146 is formed in the layer 142 of the surface cooler 140. In an alternate embodiment, a plurality of channels are formed in the layer 142 of the surface cooler 140, generally similar to channels 116 of FIGS. 6-8. A heated fluid 148 may be channeled through the surface cooler 140 via the channel 146. The heat from the fluid may be transferred from the walls of the channel 146 and dissipated into the airflow via the surface cooler 140. This fluid may then be carried back to the parts in engine 10.

In this particular embodiment, the surface cooler 140 includes a plurality of rows 150 of fins 144 protruding therefrom an uppermost surface 152 of the layer 142. The plurality of rows 150 of fins 144 are configured with an increasing height "x" of each row 150 of fins 144 in a z-direction 72, and more particularly in the direction of the bypass air flow 50, defining a plurality of air flow paths 156. As the bypass air 50 flows across the surface cooler 140, a boundary layer 154 is formed and will increase as the air flows past the surface cooler 140, thus the heat transfer will drop. By increasing the height of the fins 144 in the flow direction 50, it is surmised that the fins 144 will remain in the main bypass air flow 50 regardless of the growing boundary layer 154. Alternatively, the height of the fins 144 may be varied so that they remain in the boundary layer 154. In this alternate embodiment, the increasing fin height will offset the loss in effectiveness as the air heats up along the flow direction. This will have the effect of increasing the heat transfer efficiency of the surface cooler 140. Similar to the previously disclosed embodiments, calculations demonstrate that the weight of such a heat exchanger, or surface cooler, may be reduced by approximately 30% over a surface cooler configured to include fins of equal height.

FIG. 11 illustrates a perspective view 160 of the exemplary surface cooler 140 with the plurality of fins 144 disposed on the layer 142. An exploded view 162 of a fin 164 of a first row 166 of the plurality of rows 150 of fins 114 and a fin 168 of an adjacent second row 170 of the plurality of rows 150 of fins 144 configured as described above, shows an increase in height of fin 168, relative to fin 164 in a direction of the bypass air flow 50. As noted hereinabove, in addition to the plurality of fins 114 being configured to facilitate enhanced heat transfer by promoting an increase in the turbulence of a flow of the impinging bypass air 50, the fins 144 are configured having increasing height to assure the fins 144 will remain in the main bypass air flow 50 regardless of the growing boundary layer 154 (FIG. 10).

The various embodiments of the exemplary surface cooler described hereinabove provide augmented and improved heat transfer of the surface cooler. Additionally, the exemplary surface cooler reduces the mass of a turbomachine. Further, the exemplary surface coolers may also reduce impact on losses in the bypass flow, thus facilitating better fuel consumption.

It is understood that not necessarily all such objects or advantages described above may be achieved in accordance with any particular embodiment. Thus, for example, those skilled in the art will recognize that the systems and techniques described herein may be embodied or carried out in a manner that achieves or optimized one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The foregoing has described surface cooler for a gas turbine engine. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. A surface cooler comprising:
a plate-shaped layer comprising a thermally conductive material; and
a plurality of spaced-apart fins extending substantially perpendicular from an uppermost layer of the plate-shaped layer, each of the plurality of spaced-apart fins including at least two sloping sides disposed on perpendicular sides extending from a bottom exterior of the fin atop the plate-shaped layer to a tip spaced a distance from the plate-shaped layer, the plurality of fins comprising a thermally conductive material and defining a plurality of air flow paths,
wherein the plurality of spaced-apart fins is configured in a plurality of aligned rows, each row of the plurality of aligned rows oriented so as to extend in a direction parallel to an incoming fluid flow,
wherein at least one of the plurality of spaced-apart fins in each of the plurality of aligned rows varies in height with respect to another one of the plurality of spaced-apart fins in each of the plurality of aligned rows and relative to a thickness of a non-linear formed boundary layer on a surface of the plate-like layer, so as to extend above the boundary layer and remain in a main portion of the incoming fluid flow and as the height of the plurality of spaced-apart fins in each of the plurality of aligned rows varies, the cross sectional area of the plurality of spaced-apart fins varies,
wherein the one or more sloping sides define an increase in a volume of the plurality of air flow paths moving from the bottom exterior of the fins to the tip of the fins in contiguous rows in at least one of parallel to the incoming fluid flow or perpendicular to the incoming fluid flow, and
wherein the plurality of spaced-apart fins augment heat transfer of the surface cooler by increasing the turbulence levels of a fluid flowing through the airflow paths by promoting increased mixing with a resulting increase in the heat transfer coefficient of the surface cooler.

2. The surface cooler of claim 1, further comprising at least one fluidic conduit disposed in the plate-shaped layer, wherein the at least one fluidic conduit is configured to carry fluid to be cooled.

3. The surface cooler of claim 1, wherein the plate-shaped layer comprises one of a solid metal, a metal foam, a carbon foam or a combination thereof.

4. The surface cooler of claim 3, wherein the solid metal is aluminum.

5. The surface cooler of claim 1, wherein the plurality of spaced-apart fins comprises a solid metal, a metal foam, a carbon foam or a combination thereof.

6. The surface cooler of claim 5, wherein the solid metal is aluminum.

7. A surface cooler comprising:
a plate-shaped layer comprising one of a solid metal, a metal foam, a carbon foam or a combination thereof;
at least one fluidic conduit disposed in the plate-shaped layer, wherein the at least one fluidic conduit is configured to carry fluid to be cooled; and
a plurality of spaced-apart fins extending substantially perpendicular from an uppermost layer of the plate-shaped layer, each of the plurality of spaced-apart fins including at least two sloping sides disposed on perpendicular sides extending from a bottom exterior of the fin atop the plate-shaped layer and a tip spaced a distance from the plate-shaped layer, the plurality of fins comprising a thermally conductive material and defining a plurality of air flow paths,
wherein the plurality of spaced-apart fins is configured in a plurality of rows, each row of the plurality of aligned rows oriented so as to extend in a direction parallel to an incoming fluid flow, wherein at least one of the plurality of spaced-apart fins in each of the plurality of aligned rows varies in height with respect to another one of the plurality of spaced-apart fins in each of the plurality of aligned rows and relative to a thickness of a non-linear formed boundary layer on a surface of the plate-like layer, so as to extend above the boundary layer and remain in a main portion of the incoming fluid flow and as the height of the plurality of spaced-apart fins in each of the plurality of aligned rows varies, the cross sectional area of the plurality of spaced-apart fins varies, wherein the one or more sloping sides define an increase in a volume of the plurality of air flow paths moving from the bottom exterior of the fins to the tip of the fins in contiguous rows in at least one of parallel to the incoming fluid flow or perpendicular to the incoming fluid flow;

wherein the plurality of spaced-apart fins augment heat transfer of the surface cooler by increasing the turbulence levels of a fluid flowing through the airflow paths by promoting increased mixing with a resulting increase in the heat transfer coefficient of the surface cooler.

8. The surface cooler of claim 7, wherein the solid metal is aluminum.

9. The surface cooler of claim 7, wherein the plurality of spaced-apart fins comprises a solid metal, a metal foam, a carbon foam or a combination thereof.

10. The surface cooler of claim 9, wherein the solid metal is aluminum.

11. A method of forming a surface cooler, comprising:
forming a plate-shaped layer;
disposing at least one fluidic conduit in the plate-shaped layer, wherein the at least one fluidic conduit is configured to carry fluid to be cooled; and
machining the plate-shaped layer to form a plurality of spaced-apart fins extending substantially perpendicular from an uppermost layer of the plate-shaped layer, each of the plurality of spaced-apart fins including at least two sloping sides disposed on perpendicular sides extending from a bottom exterior of the fin atop the plate-shaped layer to a tip spaced a distance from the plate-shaped layer, the plurality of fins comprising a thermally conductive material and defining a plurality of air flow paths,
wherein the plurality of spaced-apart fins is configured in a plurality of aligned rows, each row of the plurality of aligned rows oriented so as to extend in a direction parallel to an incoming fluid flow,
wherein at least one of the plurality of spaced-apart fins in each of the plurality of aligned rows varies in height with respect to another one of the plurality of spaced-apart fins in each of the plurality of aligned rows and relative to a thickness of a non-linear formed boundary layer on a surface of the plate-like layer, so as to extend above the boundary layer and remain in a main portion of the incoming fluid flow and as the height of the plurality of spaced-apart fins in each of the plurality of aligned rows varies, the cross sectional area of the plurality of spaced-apart fins varies,
wherein the one or more sloping sides define an increase in a volume of the plurality of air flow paths moving from the bottom exterior of the fins to the tip of the fins in contiguous rows in at least one of parallel to the incoming fluid flow or perpendicular to the incoming fluid flow;

wherein the plurality of spaced-apart fins augment heat transfer of the surface cooler by increasing the turbulence levels of a fluid flowing through the airflow paths by promoting increased mixing with a resulting increase in the heat transfer coefficient of the surface cooler.

12. The method of claim 11, further comprising disposing the surface cooler along an outer wall of a turbomachine.

13. An engine comprising:
a core engine; and
a surface cooler comprising:
a plate-shaped layer comprising one of a solid metal, a metal foam, a carbon foam or a combination thereof;
at least one fluidic conduit disposed in the plate-shaped layer, wherein the at least one fluidic conduit is configured to carry fluid to be cooled; and
a plurality of spaced-apart fins extending substantially perpendicular from an uppermost layer of the plate-shaped layer, each of the plurality of spaced-apart fins including at least two sloping sides disposed on perpendicular sides extending from a bottom exterior of the fin atop the plate-shaped layer to a tip spaced a distance from the plate-shaped layer, the plurality of fins comprising a thermally conductive material and defining a plurality of air flow paths,
wherein the plurality of spaced-apart fins is configured in a plurality of aligned rows, each row of the plurality of aligned rows oriented so as to extend in a direction parallel to an incoming fluid flow,
wherein at least one of the plurality of spaced-apart fins in each of the plurality of aligned rows varies in height with respect to another one of the plurality of spaced-apart fins in each of the plurality of aligned rows and relative to a thickness of a non-linear formed boundary layer on a surface of the plate-like layer, so as to extend above the boundary layer and remain in a main portion of the incoming fluid flow and as the height of the plurality of spaced-apart fins in each of the plurality of aligned rows varies, the cross sectional area of the plurality of spaced-apart fins varies,
wherein the one or more sloping sides define an increase in a volume of the plurality of air flow paths moving from the bottom exterior of the fins to the tip of the fins in contiguous rows in at least one of parallel to the incoming fluid flow or perpendicular to the incoming fluid flow;
wherein the plurality of spaced-apart fins augment heat transfer of the surface cooler by increasing the turbulence levels of a fluid flowing through the airflow paths by promoting increased mixing with a resulting increase in the heat transfer coefficient of the surface cooler.

14. The engine of claim 13, wherein the surface cooler is disposed adjacent to a nacelle wall of the engine.

15. The engine of claim 13, wherein the surface cooler is disposed adjacent to an inner wall of the engine.

* * * * *